(12) United States Patent
Kato et al.

(10) Patent No.: US 7,659,652 B2
(45) Date of Patent: Feb. 9, 2010

(54) ELECTROSTATIC ACTUATOR WITH INTERDIGITATED ELECTRODE STRUCTURE

(75) Inventors: Yoshichika Kato, Tokyo (JP); Keiichi Mori, Tokyo (JP)

(73) Assignee: Hosiden Corporation, Osaka (JP)

(*) Notice: Subject to any disclaimer, the term of this patent is extended or adjusted under 35 U.S.C. 154(b) by 293 days.

(21) Appl. No.: 12/005,222

(22) Filed: Dec. 26, 2007

(65) Prior Publication Data
US 2008/0157627 A1 Jul. 3, 2008

(30) Foreign Application Priority Data
Dec. 28, 2006 (JP) ............... 2006-355387

(51) Int. Cl.
*H02N 2/04* (2006.01)
*B81B 3/00* (2006.01)
(52) U.S. Cl. .................. 310/309; 359/200.6
(58) Field of Classification Search ........ 310/309; 359/199.2, 200.6
See application file for complete search history.

(56) References Cited

U.S. PATENT DOCUMENTS

| 6,229,640 | B1 * | 5/2001 | Zhang | 359/290 |
| 6,303,885 | B1 * | 10/2001 | Hichwa et al. | 200/181 |
| 6,360,033 | B1 * | 3/2002 | Lee et al. | 385/18 |
| 6,771,001 | B2 * | 8/2004 | Mao et al. | 310/309 |
| 6,804,036 | B1 * | 10/2004 | Chen et al. | 359/237 |
| 6,815,865 | B2 * | 11/2004 | Marxer | 310/309 |
| 6,828,887 | B2 * | 12/2004 | Kubby et al. | 335/78 |
| 7,003,193 | B2 * | 2/2006 | Kato et al. | 385/18 |
| 7,012,491 | B1 * | 3/2006 | Geisberger et al. | 335/78 |
| 7,070,699 | B2 * | 7/2006 | Kubby et al. | 216/24 |
| 7,075,209 | B2 * | 7/2006 | Howell et al. | 310/309 |
| 7,113,386 | B2 * | 9/2006 | Tamura | 361/207 |
| 7,304,556 | B2 * | 12/2007 | Tamura et al. | 335/78 |

FOREIGN PATENT DOCUMENTS

JP       2005-037885       2/2005

OTHER PUBLICATIONS

Legtenberg, R., et al., "Comb-drive actuators for large displacements," J. Micromech, Microeng. 6, 1996, pp. 320-329.

* cited by examiner

*Primary Examiner*—Burton Mullins
(74) *Attorney, Agent, or Firm*—David N. Lathrop

(57) ABSTRACT

There is provided an electrostatic actuator with the interdigitated electrode structure comprising a movable rod 11 disposed in parallel with an alignment axis line Ox predetermined on a substrate; a movable interdigitated electrode 12 fixed on the both sides of a coupling point 11C on the movable rod 11 and having a plurality of movable electrode fingers 12b; fixed interdigitated electrodes 21, 22 fixed to the substrate and having a plurality of fixed electrode fingers 21b, 22b; and four hinges 23, 24 whose one ends are anchored respectively to the movable rod and the other ends are anchored to anchoring points 32A-32D of the substrate. Lengths of those hinges are longer than distances from anchoring points to the alignment axis line and a displacement Lc of a coupling point 11C in a direction orthogonal to the alignment axis line is reduced to be smaller than a distance between the respective movable electrode fingers and the closest fixed electrode finger.

6 Claims, 7 Drawing Sheets

ELECTROSTATIC ACTUATOR WITH INTERDIGITATED ELECTRODE STRUCTURE

BACKGROUND OF THE INVENTION

1. Field of the Invention

The present invention relates to an electrostatic actuator with an interdigitated electrode structure for use in an optical device for switching an optical path or adjusting a quantity of light coupled to each incident port by inserting/extracting a mirror into/out of an optical path.

2. Description of the Related Art

FIG. 8 shows a structure of a MEMS (Micro Electro Mechanical Systems) optical switch disclosed in Japanese Patent Application Laid-Open No. 2005-37885 as an exemplary prior art structure of an optical device of this sort using the electrostatic actuator with the interdigitated electrode structure.

Four fiber grooves 1A, 1B, 1C and 1D are formed into a shape of a cross by being coupled from each other at each one end on an upper face 20u of a substrate 20 made from a silicon wafer for example. The four optical fibers 41A, 41B, 41C and 41D are disposed within the corresponding fiber grooves 1A, 1B, 1C and 1D, respectively.

A straight slot 25 that makes an angle of 45 degrees respectively with the fiber grooves 1A and 1B is formed on the upper face 20u in a driver forming section 20A that is an area between the fiber grooves 1A and 1B that make right angles from each other. Then, a movable rod 11 that is provided with a mirror 4 at one end 11a thereof is placed within the slot 25. The movable rod 11 is movable along the straight slot 25 in this case. Each one end of leaf spring-like hinges 23R, 23L, 24R and 24L is anchored to both sides of two supporting points 111 and 112 spaced apart on the movable rod 11 and each other end of the hinges 23R, 23L, 24R and 24L is anchored to the substrate 20. The movable rod 11 is linked to the substrate 20 through each hinge as a bridge member and is supported movably in a longitudinal direction thereof and in parallel with a plane (the upper face 20u) of the substrate 20. The hinges 23R, 23L, 24R and 24L are mounted so that they elastically warp in the same direction. The movable rod 11 assumes a first stable state in the state shown in FIG. 8 and the mirror 4 is positioned at the center of the radially disposed optical fibers 41A, 41B, 41C and 41D. The movable rod 11 also assumes a second stable state in which the mirror 4 is stored within the slot 25 when the movable rod 11 is driven in a direction separating from an intersection 80 of the fiber grooves 1A, 1B, 1C and 1D and the warp of the hinges 23R, 23L, 24R and 24L is reversed. Thus, the movable rod 11 carries out a so-called bi-stable operation.

Movable interdigitated electrodes 12R and 12L are mounted on the both sides of the movable rod 11 at an intermediate position between the two supporting points 111 and 112 on the movable rod 11. The movable interdigitated electrodes 12R and 12L have beams 12aR and 12aL anchored to the movable rod 11 at right angles to the longitudinal direction thereof and movable electrode fingers 12bR and 12bL mounted to the both sides of each beam 12aR, 12aL and arrayed apart from each other in parallel. Fixed interdigitated electrodes 21R, 21L, 22R and 22L are provided so as to sandwich the movable interdigitated electrodes 12R and 12L in the longitudinal direction of the movable rod 11. The fixed interdigitated electrodes 21R and 22R have fixed electrode fingers 21bR and 22bR arrayed in parallel from each other in a direction orthogonal to the longitudinal direction of the movable rod 11 and anchored to the substrate 20. Each one end of the fixed electrode fingers 21bR and 22bR is disposed so as to interdigitate with the movable electrode finger 12bR from each other. The same applies to the fixed interdigitated electrodes 21L and 22L.

The movable electrode fingers 12bR and 12bL enter most deeply into gaps between the fixed electrode fingers 21bR and 21bL and almost come out of gaps between the fixed electrode fingers 22bR and 22bL in the first stable state of the movable rod 11 as shown in FIG. 8. In contrary to that, the movable electrode fingers 12bR and 12bL almost come out of the gaps between the fixed electrode fingers 21bR and 21bL and enter most deeply into the gaps between the fixed electrode fingers 22bR and 22bL in the second stable state of the movable rod 11.

Voltage may be supplied to the movable interdigitated electrodes 12R and 12L via terminals 15R and 15L, the hinges 23R and 23L and the movable rod 11. Voltage may be supplied to the fixed interdigitated electrodes 21R and 21L via terminals 13R and 13L and voltage may be supplied to the fixed interdigitated electrodes 22R and 22L via terminals 14R and 14L. When voltage is applied between the terminals 15R and 15L (and/or between terminals 16R and 16L) and the terminals 14R and 14L in the first stable state shown in FIG. 8, the movable interdigitated electrodes 12R and 12L are attracted by electrostatic attractive force in a direction of interdigitating with the fixed interdigitated electrodes 22R and 22L and the movable rod 11 is driven in a direction separating from the intersection 80 of the fiber grooves 1A, 1B, 1C and 1D, falling into the second stable state. As a result, the mirror 4 is stored within the slot 25. When voltage is applied between the terminals 15R and 15L (and/or between the terminals 16R and 16L) and the terminals 13R and 13L in the second stable state, the movable rod 11 returns to the first stable state shown in FIG. 8. The movable rod 11, the hinges 23R, 23L, 24R and 24L, the movable interdigitated electrodes 12R and 12L and the fixed interdigitated electrodes 21R, 21L, 22R and 22L compose the actuator 100 together with the substrate 20.

By the way, although the electrostatic actuator with the interdigitated electrode structure of the optical switch described above has been already put into practical use, there has been a case when the movable rod 11 displaces in the direction crossing with the longitudinal direction thereof in the transition process between the first and second stable states when the driving voltage is applied, causing a short-circuit of the applied voltage as the movable electrode finger 12bR contacts with the fixed electrode finger 21bR or 22bR or the movable electrode fingers 12bL contacts with the fixed electrode finger 21bL or the 22bL.

It may be caused by the following reasons. That is, it is difficult to form the hinges, fixed electrode fingers, movable electrode fingers and others strictly symmetrically about a center axis line of the movable rod in fabricating the electrostatic actuator and a very slight asymmetry is produced even when no driving voltage is applied. Thereby, the electrostatic attractive force between the fixed electrode fingers and the movable electrode fingers in one direction orthogonal to the center axis line of the movable rod becomes greater than that in the opposite direction and an asymmetrical operation is induced during the transition between the both stable states when the driving voltage is applied. When the movable electrode fingers displace even a bit in one direction as a result, the electrostatic attractive force in that direction sharply increases, causing a collision of the movable electrode fingers against the fixed electrode fingers.

The operation stops when the movable electrode fingers contact with the fixed electrode fingers. Or, there is even a possibility that the short-circuited electrode fingers are fixed with each other.

In order to avoid such a phenomenon, Non Patent Literature (Rob Legtenberg et al., "Comb-drive actuators for large displacements" J. Micromech, Microeng. 6, 1996, pp. 320-329) disclosed a method of reducing the displacement caused by the electrostatic attractive force by increasing a thickness of the hinges to enhance its rigidity. When the rigidity of the hinge is enhanced, however, it becomes necessary to increase the driving voltage necessary for driving the movable rod in its center axis direction. Still more, the electrostatic attractive force also increases when the driving voltage is increased, it becomes difficult to assure a stable operation of causing no contact.

SUMMARY OF THE INVENTION

Accordingly, it is an object of the invention to provide an electrostatic actuator with an interdigitated electrode structure that hardly causes a contact between movable electrode fingers and fixed electrode fingers.

An electrostatic actuator with an interdigitated electrode structure of the invention comprises a substrate; a movable rod disposed by aligning its axis with an alignment axis line predetermined on the substrate; a movable interdigitated electrode fixed to a coupling point on the movable rod and having a plurality of movable electrode fingers arrayed at intervals in a direction orthogonal to a longitudinal direction of the movable rod, in parallel with the longitudinal direction of the movable rod and in parallel from each other; a fixed interdigitated electrode fixed on the substrate and having a plurality of fixed electrode fingers disposed alternately in parallel with the movable electrode fingers and in parallel from each other; and first and second hinges whose one ends are anchored respectively to first and second supporting points disposed apart from each other on the movable rod and whose other ends are anchored respectively to first and second anchoring points on the substrate, wherein the movable rod is supported so as to be movable along the alignment axis line; the coupling point exists on the same side as the second supporting point as viewed from the first supporting point; lengths of the first and second hinges are longer than distances from the first and second anchoring points to which those hinges are anchored to the alignment axis line respectively by $|L_1|$ and $|L_2|$; positional coordinates of the first and second supporting points in the direction perpendicular to the alignment axis line as coordinate origin reach respectively to $L_1$ and $L_2$ when the hinges are entirely extended respectively in the direction perpendicular to the alignment axis line; and an absolute value $|L_c|$ of $L_c = L_1 + (L_2 - L_1) d_1 / L_s$ is reduced to be smaller than any distance between each of the movable electrode fingers and the closest fixed electrode finger on the side in the direction represented by a sign of the $L_c$ in the coordinate system in the state when the movable rod is aligned with the alignment axis line, where $d_1$ and $L_s$ are the distances respectively from the first supporting point to the coupling point and to the second supporting point.

According to the present invention, the maximum displacement of the coupling point as a function of the difference between the length of the two hinges and the distances from the anchoring points on the substrate to which one ends of the hinges are anchored to the alignment axis line is reduced to be smaller than the gap between each of the movable electrode fingers and the closest fixed electrode finger on the side separating from the movable rod, so that there is little possibility of causing a contact of the movable electrode fingers with the fixed electrode fingers.

DETAILED DESCRIPTION

Figure 1:
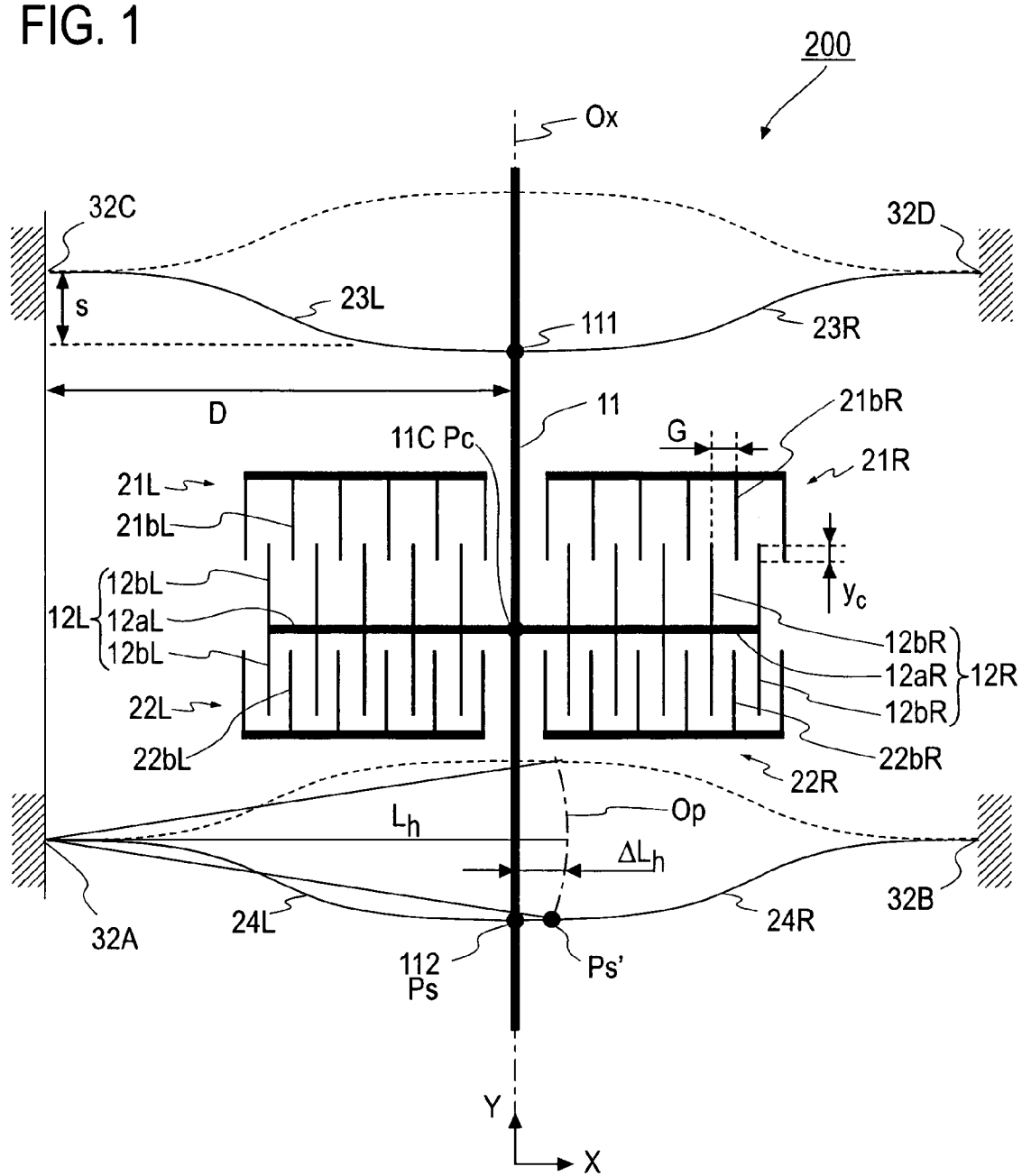
FIG. 1 is a plan view showing an embodiment of the invention.

A preferred embodiment and its modifications of the invention will be explained with reference to FIGS. 1 through 7. FIG. 1 is a schematic plan view of an electrostatic actuator with an interdigitated electrode structure 200 (called simply as an actuator 200 hereinafter) according to the embodiment of the invention. A basic structure of the actuator 200 is the same as one of the actuator 100 shown in FIG. 8 and its structural elements will be explained adequately by denoting the same reference numerals to the corresponding parts.

Figure 8:
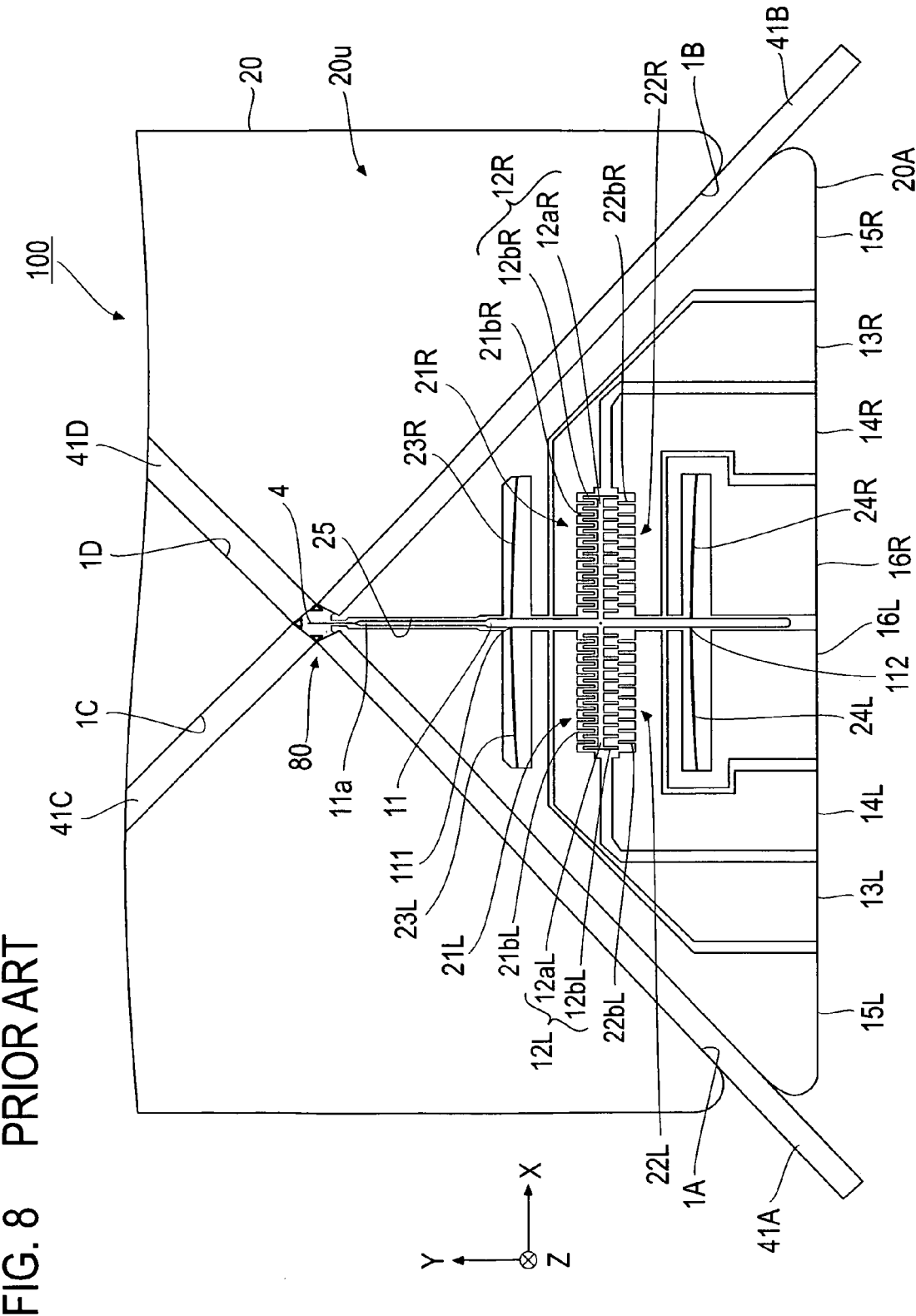
FIG. 8 is a plan view showing an example of an electrostatic actuator with the interdigitated electrode structure mounted in a conventional optical device.

Similarly to the actuator 100 shown in FIG. 8, the actuator 200 is formed integrally with a substrate made from a silicon wafer by implementing anisotropic etching. A movable rod 11 is disposed on an alignment axis line Ox in a stable state. Each one end of hinges 23R, 23L, 24R and 24L disposed by two each on the both sides of the movable rod 11 is anchored to supporting points 111 and 112 on the movable rod 11 and another end of the hinges 23R, 23L, 24R and 24L is anchored respectively to anchoring points 32A, 32B, 32C and 32D on the substrate. A direction in parallel with the alignment axis line Ox is set as a Y-axis and a direction orthogonal to that is set as an X-axis as coordinates in FIG. 1.

The distances from the alignment axis line Ox to each of the anchoring points 32A, 32B, 32C and 32D are equal in the example shown in FIG. 1. Let the distance be denoted by D. The anchoring points 32A and 32C are disposed at the symmetrical position of the anchoring points 32B and 32D about the alignment axis line Ox in the example shown in FIG. 1. Length $L_h$ of each of the hinges 23R, 23L, 24R and 24L is longer than the distance D between the each of the anchoring points 32A, 32B, 32C and 32D and the alignment axis line Ox. The hinges 23R, 23L, 24R and 24L stably hold the movable rod 11 in a state when they elastically warp convexly in the same direction in the longitudinal direction of the movable rod 11. The movable rod 11 is movable in the direction of the alignment axis line Ox when the direction of the warp of the hinges 23R, 23L, 24R and 24L changes.

Beams 12aR and 12aL extending on the both sides of the movable rod 11 in a direction orthogonal to the longitudinal direction of the movable rod 11 are fixedly provided at a coupling point 11C that is an intermediate point Pc between the supporting points 111 and 112 on the movable rod 11 in the same manner as the actuator 100 shown in FIG. 8. Then, movable interdigitated electrodes 12R and 12L are constructed by fixing a plurality of movable electrode fingers 12bR and 12bL arrayed in parallel from each other so as to be orthogonal to the beams 12aR and 12aL. Fixed interdigitated electrodes 21R, 21L, 22R and 22L are fixedly provided on the substrate so as to sandwich the movable interdigitated electrodes 12R and 12L in the direction of the alignment axis line Ox. Fixed electrode fingers 21bR, 21bL, 22bR and 22bL of the fixed interdigitated electrodes 21R, 21L, 22R and 22L are disposed so as to be parallel from each other and to be positioned alternately with the movable electrode fingers 12bR and 12bL.

Because the hinges 23R, 23L, 24R and 24L, the movable interdigitated electrodes 12R and 12L, the fixed interdigitated electrodes 21R, 21L, 22R and 22L and the anchoring points 32A, 32B, 32C and 32D are disposed symmetrically about the alignment axis line Ox in the embodiment shown in FIG. 1, one side of the alignment axis line Ox will be mainly explained in the explanation below.

When the actuator 100 shown in FIG. 8 is taken into consideration, the movable rod 11 supported by the hinges 23R, 23L, 24R and 24L indicated by solid lines in FIG. 1 is positioned in the second stable state. Position of the supporting point 112 on the alignment axis line Ox when the movable rod 11 is positioned in the second stable state in FIG. 1 will be defined as Ps. Then, consider a case when the movable rod 11 displaces from the alignment axis line Ox in a right direction in FIG. 1 by some reason in a process transiting from the second stable state to the first stable state. If no fixed interdigitated electrodes 21R, 21L, 22R and 22L are provided, an arc drawn by the hinges 23L and 24L on the left side of the movable rod 11 in an entirely extending state becomes a locus Op that is the rightmost possible position of the supporting point 112. The supporting point 111 also draws a similar arc locus. Accordingly, all of points on the movable rod 11 also draw a similar arc locus. When a distance from an arbitrary point Ps' on the locus Op to the alignment axis line Ox is $\Delta L_h$, then $\Delta L_h \leq \Delta L_{max} = L_h - D$. $\Delta L_{max}$ is a maximum value of $\Delta L_h$.

For convenience of the explanation, all of distances between the respective electrode fingers of the movable interdigitated electrodes 12R and 12L and the fixed interdigitated electrodes 21R, 21L, 22R and 22L are considered to be equal. Furthermore, a gap between the arbitrary movable electrode finger 12bR (12bL) and the fixed electrode finger 21bR and 22bR (21bL and 22bL) neighboring with the movable electrode finger on the side separating from the movable rod 11 will be denoted as G. An equation (1) represents a requisite of the movable electrode fingers 12bR (12bL) not contacting with the fixed electrode fingers 21bR and 22bR (21bL and 22bL). It is noted that the equalization of all of the distances between the respective electrode fingers of the movable interdigitated electrodes 12R and 12L and the fixed interdigitated electrodes 21R, 21L, 22R and 22L is not an essential technological matter. When the distances between the respective electrode fingers are not equal, the gap G is least one among the distances between the respective movable electrode fingers 12bR (12bL) and the neighboring fixed electrode fingers 21bR and 22bR (21bL and 22bL) positioned on the side where the coupling point 11C displaces with respect to the respective movable electrode fingers 12bR (12bL) in the state in which the movable rod 11 is aligned with the alignment axis line Ox.

$$L_h - D = \Delta L_{max} < G \quad (1)$$

When the respective movable electrode fingers 12bR (12bL) are positioned just middle of the neighboring fixed electrode fingers 21bR and 22bR (21bRL and 22bL), the electrostatic attractive force to the respective movable electrode fingers keeps its balance even if voltage is applied between the movable interdigitated electrodes 12R (12L) and the fixed interdigitated electrodes 21R and 22R (21L and 22L). However, when the electrostatic attractive force between the fixed interdigitated electrodes 21R and 22R (21L and 22L) and the movable interdigitated electrodes 12R (12L) and other active force increase in one direction orthogonal to the alignment axis line Ox by a very small asymmetry of the actuator including the fabricated interdigitated electrodes and the hinges or by asymmetry of operation induced even if there is no apparent asymmetry in the elements of the actuator, the movable rod 11 deviates from the alignment axis line Ox and the electrostatic attractive force in one direction to the fixed electrode fingers 21bR and 22bR (21bL and 22bL) increases further in the electrostatic attractive force acting on the respective movable electrode fingers 12bR (12bL). As a result, the movable rod 11 displaces further in that direction.

Figure 2:
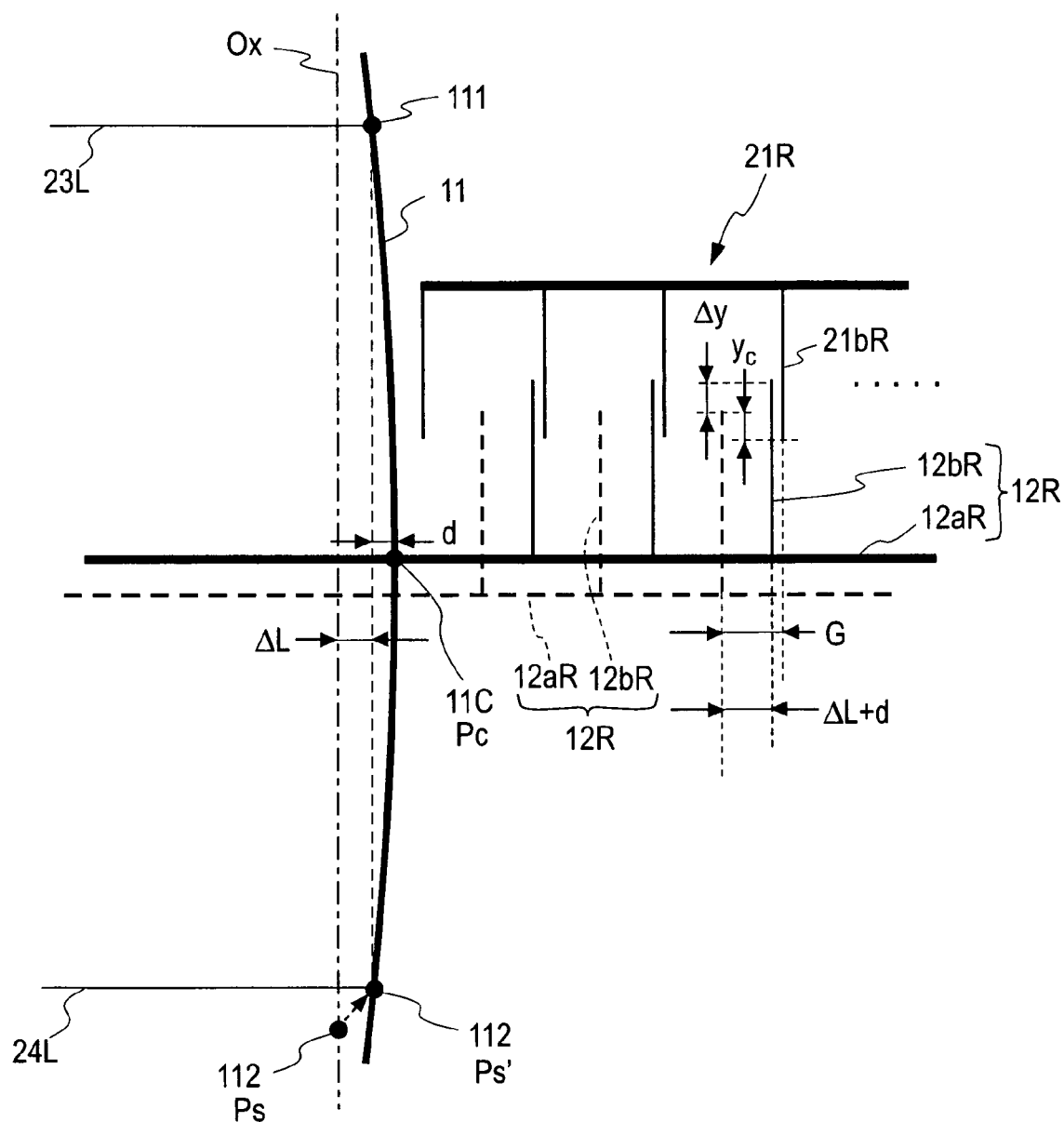
FIG. 2 is a diagram for explaining balance between reaction force caused by curving of a movable rod and electrostatic attractive force.

The condition expressed by the equation (1) may be a sufficient condition of the movable electrode fingers 12bR (12bL) not contacting with the fixed electrode fingers 21bR and 22bR (21bL and 22bL) when the elastic warp of the movable rod 11 caused by the electrostatic attractive force between the movable interdigitated electrodes 12R (12L) and the fixed interdigitated electrodes 21R and 22R (21L and 22L) is negligibly small. A case when the warp is so large that it cannot be negligible will be explained below with reference to FIG. 2. FIG. 2 shows mainly the movable rod 11, the movable interdigitated electrode 12R and the fixed interdigitated electrode 21R shown in FIG. 1 on the right side thereof to simplify the explanation. In FIG. 2, a broken line indicates the movable interdigitated electrode 12R before its displacement. Assume that the movable rod 11 displaces by $\Delta L_h$ in maximum from the alignment axis line Ox to the right side of the figure, the movable rod 11 warps by the electrostatic attractive force in this state as shown in FIG. 2 and the center of the warp thereof displaces further in the X-axis direction by a distance d. This displacement d is determined by a balance between the reaction force Fm caused by elastic modulus k of the movable rod 11 and the electrostatic attractive force Fe.

The following equation (2) represents the electrostatic attractive force Fe in the direction orthogonal to the alignment axis line Ox between the movable interdigitated electrodes 12R and 12L and the fixed interdigitated electrodes 21R, 21L, 22R and 22L at arbitrary position Pc (x, y) that can be taken by the coupling point 11C on the movable rod 11 during when the movable rod 11 transits from the second stable state in which the supporting point 112 shown in FIG. 2 is positioned on the point Ps on the alignment axis line Ox to the first stable state.

$$Fe = \frac{n\varepsilon h(y_c + \Delta y)}{2(G-x)^2}V^2 - \frac{n\varepsilon h(y_c + \Delta y)}{2(G+x)^2}V^2 \quad (2)$$

A depth of overlap of the movable electrode fingers 12bR and 12bL with the fixed electrode fingers 21bR and 21bL in the Y-axis direction in the second stable state, i.e., when the supporting point 112 is positioned at the point Ps, is indicated by $y_c$ and it is assumed that the overlap increases by a movement $\Delta y$ in the Y direction when the supporting point 112 moves from the point Ps. n in the equation (2) is a number of the movable electrode fingers 12bR and 12bL, $\in$ is a dielectric constant of air, V is voltage to be applied between the movable interdigitated electrodes 12R and 12L and the fixed interdigitated electrodes 21R and 21L and h is a height of overlap of the movable electrode fingers 12bR and 12bL and the fixed electrode fingers 21bR and 21bL in a Z-axis direction (direction perpendicular to the face of the figure).

Still more, a displacement x of the movable interdigitated electrodes 12R and 12L in the X-axis direction is $x=\Delta L_h+d$. The following equation (3) represents the reaction force Fm of the movable rod 11 at the displacement d of the coupling point 11C on the movable rod 11 in the X-axis direction by the warp of the movable rod 11 caused by the electrostatic attractive force. $\Delta L_h$ may be expressed by the following equation (4).

$$Fm = kd = k(x - \Delta L_h) \quad (3)$$

$$\Delta L_h = \sqrt{L_h^2 - (s - \Delta y)^2} - D \quad (4)$$

s is a distance between the anchoring points 32C and 32D of the hinge and the supporting point 111 in the Y-axis direction (see FIG. 1). It is possible to prevent the movable electrode fingers 12bR and 12bL from contacting with the fixed electrode fingers 21bR and 21bL by determining values of parameters k, V, L and D so that position where the electrostatic attractive force Fe balances with the reaction force Fm falls within a range of the gap G.

Figure 3:
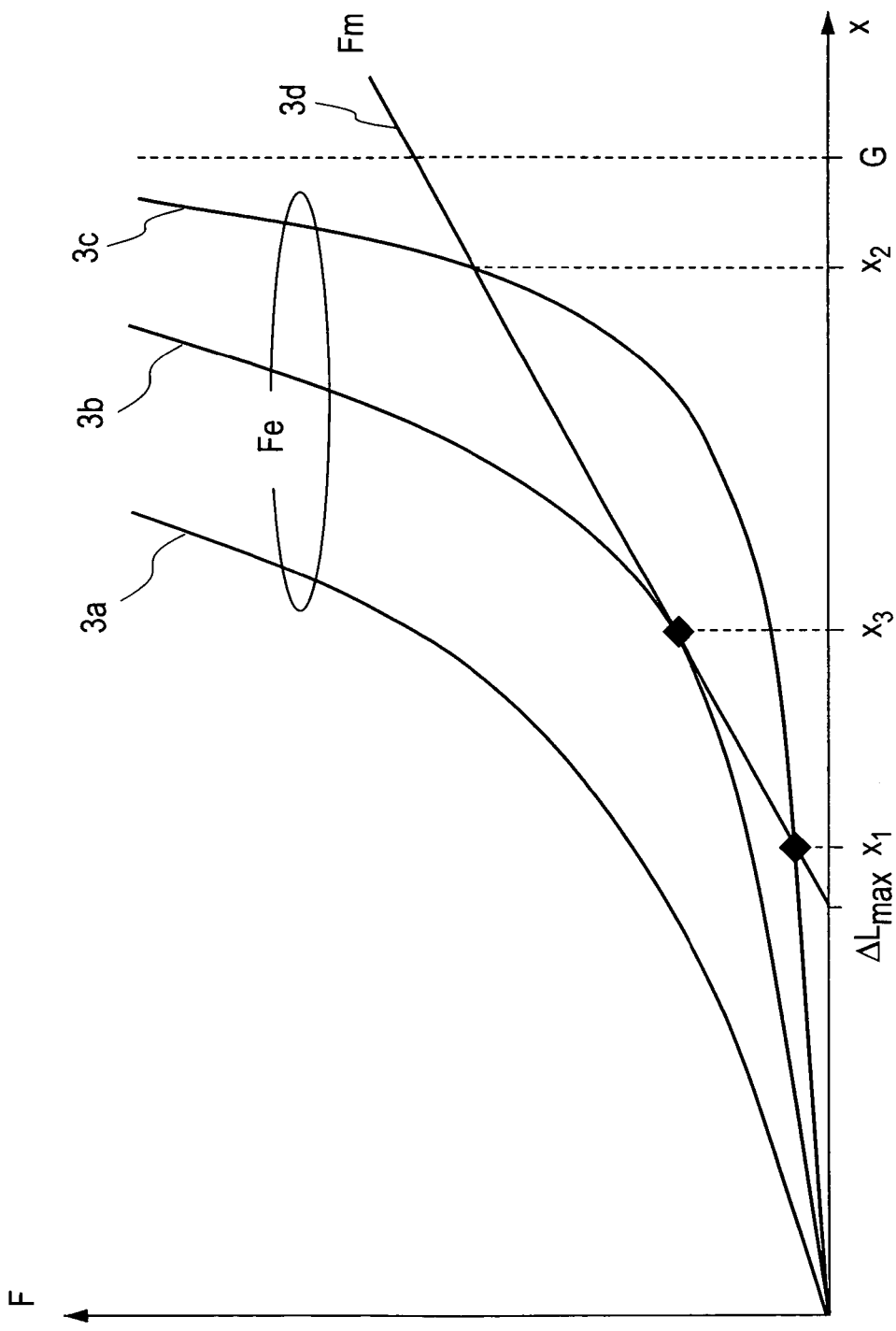
FIG. 3 is a graph for explaining the balance between the reaction force of the movable rod and the electrostatic attractive force.

FIG. 3 is a graph showing exemplary curves 3a, 3b and 3c representing the relationships of the displacement x of one of the movable electrode fingers 12bR and 12bL in the X-axis direction with the electrostatic attractive force Fe that is expressed by the equation (2) and that acts on the movable rod 11, as well as an exemplary straight line 3d representing the relationship of the reaction force Fm represented by the equation (3) caused by the movable rod 11 when it warps due to the electrostatic attractive force with the displacement x described above when the position of the movable interdigitated electrodes 12R and 12L in the Y-axis direction is fixed (when the applied voltage V is fixed). The electrostatic attractive force Fe increases sharply as the displacement x increases, i.e., as the distance between the movable electrode fingers 12bR and 12bL and the fixed electrode fingers 21bR and 21bL narrows down. In contrary to that, the reaction force Fm of the movable rod 11 linearly increases.

In order to facilitate understanding of the embodiment, assume a case when the movable interdigitated electrodes 12R and 12L receive the electrostatic attractive force, the movable rod 11 displaces in the X-axis direction without warping and the hinges 23L and 24L entirely extend straightly in the X-axis direction. The reaction force Fm at this time is an intersection of the straight line 3d with the X-axis in FIG. 3, i.e., $x=\Delta L_{max}$. Assume also a case when the movable rod 11 warps by the electrostatic attractive force from this state and the displacement x of the movable electrode fingers 12bR and 12bL increases further. In case of the curve 3c, the reaction force Fm increases due to the warp and is equalized with the electrostatic attractive force Fe at the displacement $x_1$. If the displacement x exceeds this equilibrium point $x_1$, the relationship turns out to be Fm>Fe, so that the movable interdigitated electrodes 12R and 12L are pulled back toward the alignment axis line Ox by the reaction force of the movable rod 11. The movable electrode fingers 12bR and 12bL will not contact with the fixed electrode fingers 21bR and 21bL even if the movable rod 11 warps due to the electrostatic attractive force by arranging so that such equilibrium point $x_1$ falls within the range of the gap G.

When the displacement x exceeds the position $x_1$ and exceeds further a position $x_2$ that is a second intersection by some reason, the relationship turns out to be Fe>Fm, so that the movable electrode fingers 12bR and 12bL contact with the fixed electrode fingers 21bR and 21bL. However, because the movable rod 11 actually starts to warp from a straight state by the electrostatic attractive force, the displacement x will not fall into a region exceeding the second intersection and equilibrates inevitably at the first intersection $x_1$.

When there is no intersection with the straight line 3d, i.e., there is no equilibrium point, like the curve 3a due to a reason when the applied voltage V is excessive for example in FIG. 3, the movable electrode fingers 12bR and 12bL contact with the fixed electrode fingers 21bR and 21bL when the electrostatic attractive force in the X-axis direction is generated due to the deviation of the movable rod 11 by some mechanical error. This indicates that the elastic modulus k of the movable rod 11 is small and the reaction force is insufficient, representing an unstable actuator.

The curve 3b shows a characteristic on a boundary between the curve 3a having the characteristic that it is impossible to return by the reaction force described above and the curve 3c having the characteristic that it is possible to return, and contacts with the straight line 3d at one point of position $x_3$. This relationship means that the stability of the actuator is in a critical state. The curve of the electrostatic attractive force Fe always crosses with the straight line 3d of the reaction force Fm when it is on the right side of the curve 3b, so that the relationship changes from Fe>Fm to Fe<Fm before and after the intersection. That is, it is possible to balance the electrostatic attractive force Fe with the reaction force Fm within the range of the gap G. However, the curve of the electrostatic attractive force Fe does not cross with the straight line 3d when it is on the left side of the curve 3b and the relationship turns out to be always Fe>Fm, so that there is possibility that the movable electrode fingers 12bR and 12bL contact with the fixed electrode fingers 21bR and 21bL by the electrostatic attractive force.

Although the explanation related to FIG. 3 has been made by fixing the position y of the movable rod 11 in the Y-axis direction, the electrostatic attractive force Fe represented by the equation (2) changes by the position of the movable rod 11 in the Y-axis direction that can be taken when the left hinges 23L and 24L turn centering on the anchoring points 32A and 32C in the state when they entirely extend straightforwardly in FIG. 1. That is, the electrostatic attractive force Fe varies depending on a depth $y_c+\Delta y$ of mutual intrusion of the movable electrode fingers 12bR and 12bL and the fixed electrode fingers 21bR and 21bL.

Figure 4:
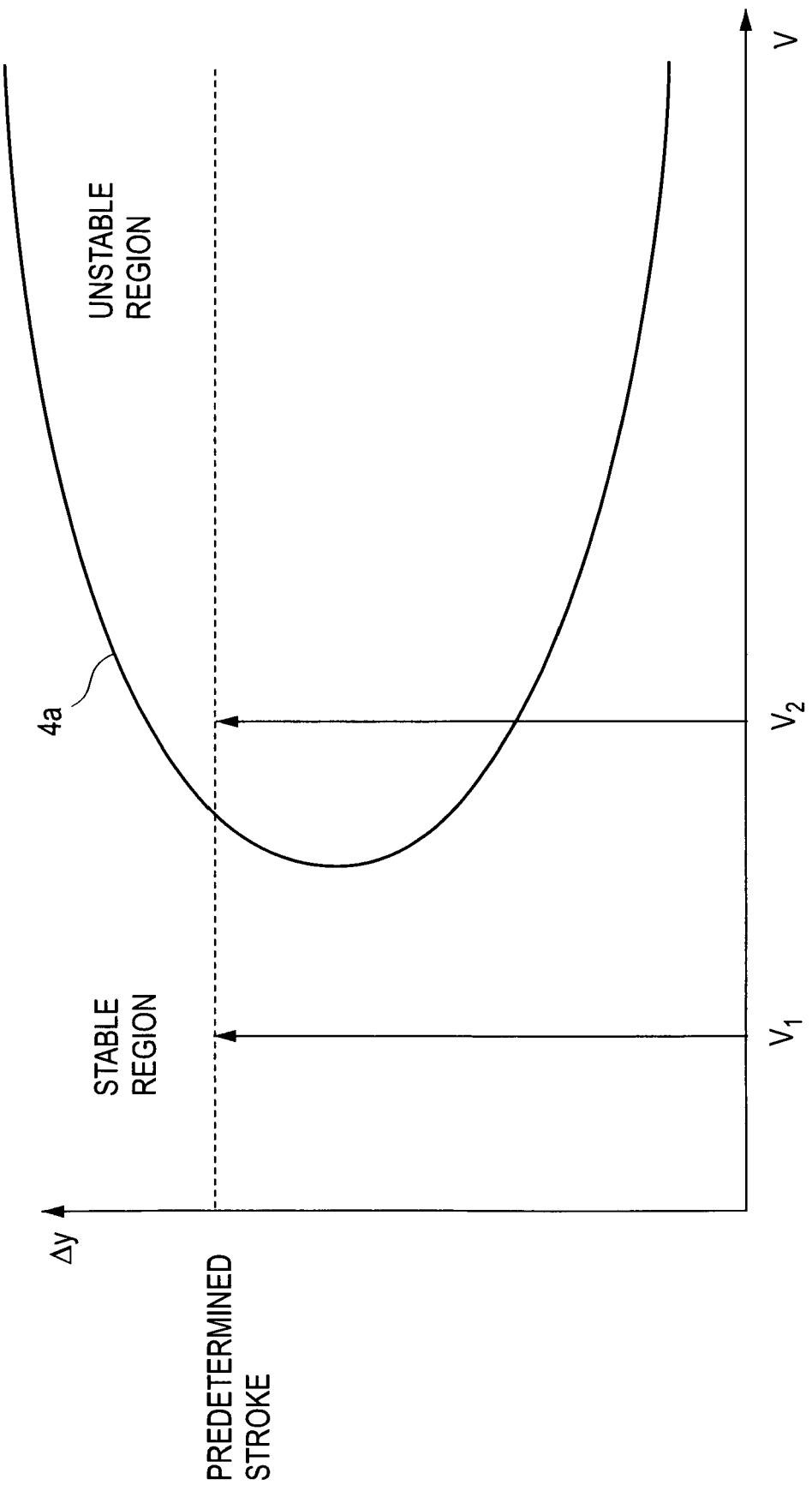
FIG. 4 is a graph for explaining a stable operation range of the electrostatic actuator with the interdigitated electrode structure.

Then, it is possible to obtain a curve 4a as shown in FIG. 4 by plotting the relationship between the applied voltage V that brings about the critical Fe curve related to the stability like the curve 3b shown in FIG. 3 and the displacement Δy of the movable rod 11 in the Y-axis direction. A region on the right side of the curve 4a is an unstable region and a region on the left side thereof is a stable region. When the applied voltage is $V_1$ for example, it is possible to always realize stable operations of the actuator because the movable rod 11 does not pass the unstable region in the process of transiting to the other stable state. The movable rod 11 passes through the unstable region when the applied voltage is $V_2$ on the other hand, so that the operation of the actuator becomes unstable (there is a possibility that the movable electrode fingers contact with the fixed electrode fingers).

The explanation related to FIGS. 3 and 4 described above may be expressed in other words. That is, it will do if combined force of the electrostatic attractive force Fe in the direction orthogonal to the longitudinal direction of the movable rod 11 generated between the movable interdigitated electrodes 12R and 12L and the fixed interdigitated electrodes 21R, 21L, 22R and 22L by the applied driving voltage and the reaction force Fm is zeroed or acts toward the direction of the alignment axis-line Ox at any position the movable rod 11 can assume when the reaction force caused by the warping of the movable rod 11 acts toward a direction opposite from the displacement of the coupling point 11C in the state when the hinges 23L and 24L entirely extend.

Although the conditions of the equation (1) described above have been that the coupling point 11C is located at the center of the supporting points 111 and 112 and that the difference $\Delta L_h$ between the lengths of the respective hinges 23R, 23L, 24R and 24L and the distances from the anchoring points 32A, 32B, 32C and 32D to the alignment axis line Ox are all equal, they may be different. For example, assume a case as shown FIG. 5 that diagrammatically shows a modified embodiment when the difference between the length of the two hinges 23L and 24L on the same side of the movable rod 11 and the distance from their anchoring points 32C and 32A to the alignment axis line Ox are $|L_1|$ and $|L_2|$ and the first and second supporting points 112 and 111 reach respectively to coordinates in the transverse direction in the figure perpendicular to the alignment axis line Ox (correspond to X-axis in FIG. 1) $L_1$ and $L_2$. When the position of the coupling point 11C is located at distance $d_1$ and $d_2$ respectively from the supporting points 112 and 111, the coordinates $L_c$ in the transverse direction perpendicular to the alignment axis line Ox of the coupling point 11C in the state when the two hinges 23L and 24L entirely extend may be expressed by the following equation (5):

$$L_c = L_1 + (L_2 - L_1) d_1 / L_s \quad (5)$$

$L_s = d_1 + d_2$ is a distance between the supporting points 111 and 112. It will do by determining the parameters so as to meet the equation (1) by setting an absolute value of the $L_c$, i.e., $|L_c|$, as a maximum value $\Delta L_{max}$ of the displacement $\Delta L_h$. The same situation as shown in FIG. 1 may be realized by setting $L_1 = L_2 = \Delta L_h$ in the equation (5).

Figure 6:
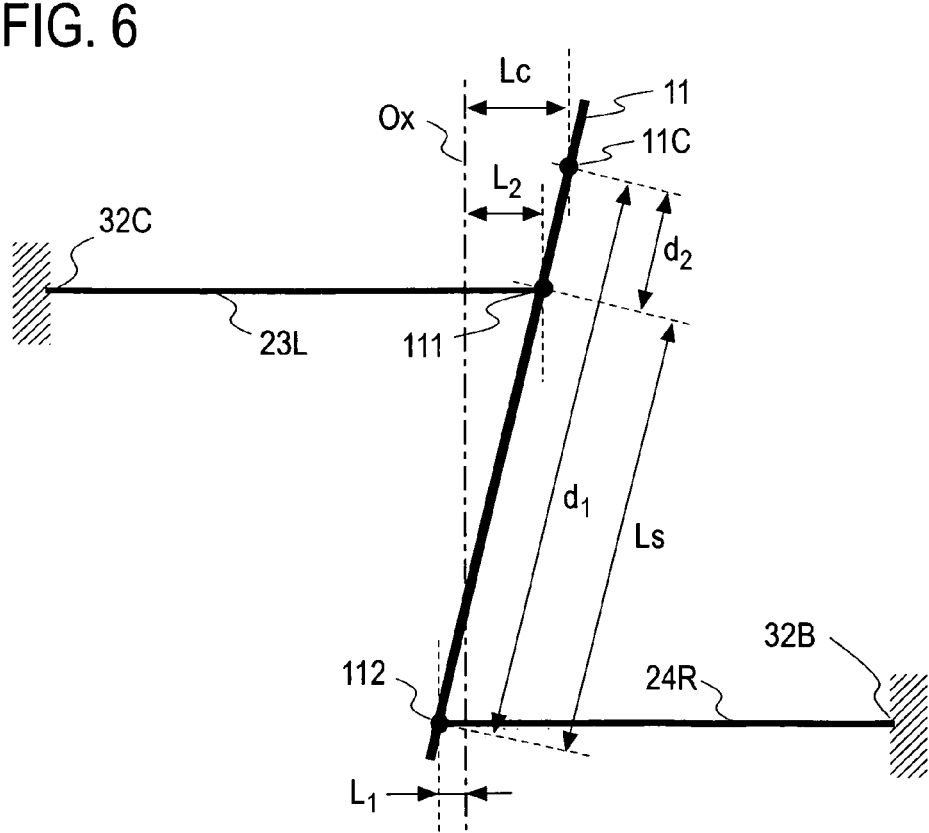
FIG. 6 is a diagram for explaining the maximum displacement of the coupling point when two hinges disposed on the opposite sides entirely extend and the coupling point is located on the outside of the two supporting points.

Furthermore, although the case when the movable rod 11 displaces in the direction substantially orthogonal to the alignment axis line Ox has been explained as the asymmetric operation of the actuator, the operation induced by delicate unbalance of various active forces include a rotational displacement component. For example, when there is a difference between the electrostatic driving force in the direction of the alignment axis line Ox caused by the movable interdigitated electrode 12L and the fixed interdigitated electrode 22L on the left side and that on the right side in FIG. 1, the movable rod 11 receives force inducing angular motion with respect to the alignment axis line Ox. When the movable rod 11 receives such rotational force remarkably, one hinge 23R (23L) on one side of the movable rod 11 and one hinge 24L (24R) on the other side of the movable rod 11 entirely extend (assume that the other hinges are not entirely extended) as shown in FIG. 6. Or, in a case of a construction in which the coupling point 11C is provided on the outside of the two supporting points 111 and 112 on the movable rod 11 like the modified embodiment shown in FIG. 6, one hinge 23R (23L) on one side of the movable rod 11 and one hinge 24L (24R) on the other side of the movable rod 11 entirely extend (assume that the other hinges not shown are not entirely extended) as shown in FIG. 6 in the end even if force unbalanced only in the direction orthogonal to the alignment axis line Ox acts on the coupling point 11C without rotational force. If the coupling point 11C is located between the supporting points 111 and 112 in the above situation, the displacement of the coupling point 11C in the direction orthogonal to the alignment axis line Ox is smaller than larger one among $|L_1|$ and $|L_2|$. However, if the coupling point 11C is located on the outside between the supporting points 111 and 112 as shown in FIG. 6, the displacement becomes even larger than larger one among $|L_1|$ and $|L_2|$. The equation (5) holds as it is even when the hinges on the both sides of the movable rod 11 entirely extend by one each as described above by defining signs of the coordinate in the transverse direction, i.e., the right side of the figure from the alignment axis line Ox as plus (plus direction of the X-axis in FIG. 1) and the right side as minus.

Figure 5:
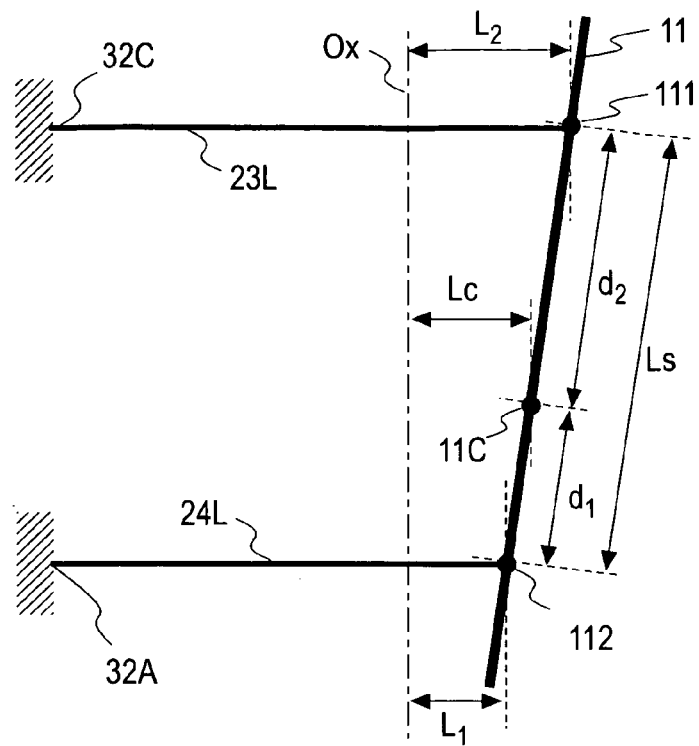
FIG. 5 is a diagram for explaining a maximum displacement of a coupling point when two hinges disposed on the same side entirely extend and when the coupling point is located between the two supporting points.

Accordingly, it will do by determining the parameters so as to meet the equation (1) by setting the absolute value of $L_c$ determined by the equation (5), i.e., $|L_c|$, as the maximum value $\Delta L_{max}$ in any cases in FIGS. 1, 5 and 6. The parameters are the length of the hinges, the distance from the anchoring point where one end of the hinges is anchored to the alignment axis line Ox and the distance between the fixed electrode fingers (or distance between the movable electrode fingers).

It is noted that although the two hinges entirely and concurrently extend in the direction perpendicular to the alignment axis line Ox in the examples shown in FIGS. 5 and 6, this kind of state is not the case in general. Still more, strictly speaking, the length of the electrode fingers should be also included as an factor in the conditions by which the movable electrode fingers 12bR and 12bL do not contact with the fixed electrode fingers 21bR and 21bL, 22bR and 22bL from each other in the state when they are not parallel from each other. However, it is possible to fully achieve the object approximately actually by determining the various parameters on the basis of the equation (5). The example shown in FIG. 5 is applicable to the case when two or more hinges are provided on the same side of the movable rod 11 and arbitral two hinges among them entirely extend. The example shown in FIG. 6 is applicable to the case when one or more hinges are provided on one side of the movable rod 11, one or more hinges are provided also on the other side and one hinge on one side and one hinge on the other side among them entirely extend.

The embodiment of the invention described above has been explained by exemplifying the case when the four hinges 23R, 23L, 24R and 24L having the equal length are provided symmetrically on the right and left about the movable rod 11. However, the disposition of the hinges needs not be symmetrical about the movable rod 11. For example, positions for mounting the hinges to the movable rod 11 may be shifted on the right and left sides of the figure. Still more, the distances from the respective anchoring points to the alignment axis line Ox may be differentiated and the length of the hinges 23R and 23L may be also differentiated from that of the hinges 24R and 24L. Furthermore, three or more hinges may be provided on each side of the movable rod 11. Or, it is possible to arrange such that a number of hinges on one side is two or more and a number of hinges on the other side is 0 or 1 or more. The coupling point 11C may be provided at arbitrary position on the movable rod 11 in any case.

Figure 7A:
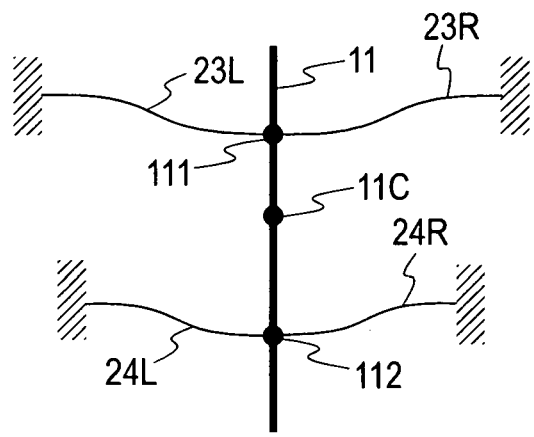
FIG. 7A shows a case when length of one type of hinges 23R and 23L is different from that of another type of hinges 24R and 24L.

FIG. 7A shows a modified embodiment in which lengths of the hinges 23R, 23L, 24R and 24L are differentiated. It shows only the movable rod 11 and the hinges 23R, 23L, 24R and 24L in order to simplify the drawing.

Figure 7B:
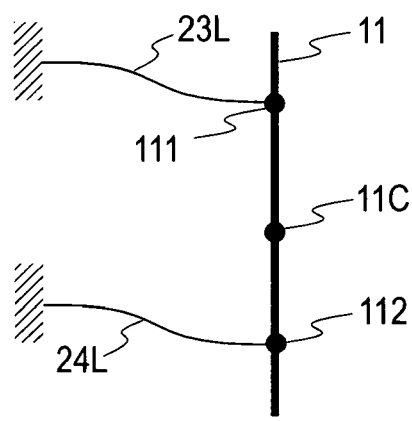
FIG. 7B shows a case when two hinges are located only on one side of the movable rod.

FIG. 7B shows a modified example in which two hinges are provided only one side of the movable rod 11. The actuator of this case displaces the movable rod 11 in the axial direction only by a value corresponding to driving voltage, not carrying out the bi-stable operation. This kind of actuator providing an optical filter whose optical density changes continuously in the axial direction to a distal end 11a of the movable rod 11 instead of the mirror 4 for example may be used in a device for varying a quantity of light transmitting through the optical filter by driving voltage.

Figure 7C:
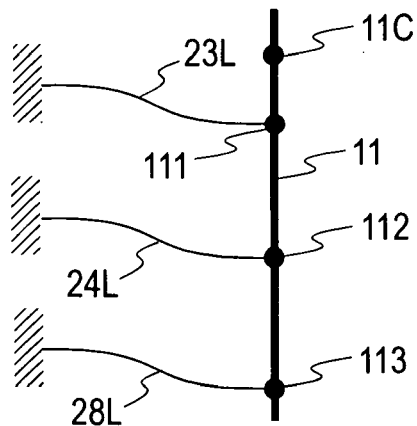
FIG. 7C shows a case when three hinges are located only on one side of the movable rod and the coupling point is located out of three supporting points.

FIG. 7C shows a modified embodiment of the embodiment shown in FIG. 7B in which a hinge 28L anchored to a supporting point 113 is added further on the opposite side of the hinge 23L with respect to the hinge 24L and the coupling point 11C is provided on the outsides of the supporting points 111 and 113.

As it will be understood from the above explanation, it will do by determining the parameters so as to meet the equation (1) by setting the displacement $|L_c|$ as the maximum value $\Delta L_{max}$ of the coupling point 11C in the direction orthogonal to the alignment axis line Ox determined by the equation (5) from the differences $L_1$ and $L_2$ of the length of at least two hinges and the distance from their anchoring points to the alignment axis line Ox in any embodiments.

What is claimed is:

1. An electrostatic actuator with an interdigitated electrode structure, comprising:
    a substrate;
    a movable rod disposed by aligning its axis with an alignment axis line predetermined on said substrate;
    a movable interdigitated electrode fixed to a coupling point on said movable rod and having a plurality of movable electrode fingers arrayed at intervals in a direction orthogonal to a longitudinal direction of said movable rod, in parallel with the longitudinal direction of said movable rod and in parallel from each other;
    a fixed interdigitated electrode fixed on said substrate and having a plurality of fixed electrode fingers disposed alternately in parallel with said movable electrode fingers and in parallel from each other; and
    first and second hinges whose one ends are anchored respectively to first and second supporting points disposed apart from each other on said movable rod and whose other ends are anchored respectively to first and second anchoring points on said substrate; wherein
    said movable rod is supported so as to be movable along said alignment axis line;
    said coupling point exists on the same side as said second supporting point as viewed from said first supporting point;
    lengths of said first and second hinges are longer than distances from said first and second anchoring points to which those hinges are anchored to said alignment axis line respectively by $|L_1|$ and $|L_2|$;
    positional coordinates of said first and second supporting points in the direction perpendicular to said alignment axis line as coordinate origin reach respectively to $L_1$ and $L_2$ when said hinges are entirely extended respectively in the direction perpendicular to said alignment axis line; and an absolute value $|L_c|$ of $Lc=L_1+(L_2-L_1)$ $d_1/Ls$ is reduced to be smaller than any distance between the respective movable electrode fingers and the closest fixed electrode finger on the side in the direction represented by a sign of the Lc in the state when said movable rod is aligned with said alignment axis line, where $d_1$ and Ls are the distances respectively from said first supporting point to said coupling point and to said second supporting point.

2. The electrostatic actuator with the interdigitated electrode structure according to claim 1, wherein said first and second hinges are provided on one side of said movable rod.

3. The electrostatic actuator with the interdigitated electrode structure according to claim 1, wherein said first and second hinges are provided respectively on one side and another side of said movable rod.

4. The electrostatic actuator with the interdigitated electrode structure according to claims 2 or 3, further comprising third and fourth hinges whose one ends are anchored respectively to third and fourth supporting points disposed apart from each other on said movable rod and whose other ends are anchored to third and fourth anchoring points provided respectively on the opposite side from said first and second anchoring points with respect to said alignment axis line on said substrate.

5. The electrostatic actuator with the interdigitated electrode structure according to any one of claims 1 to 3, wherein the electrostatic attractive force in the direction orthogonal to the longitudinal direction of said movable rod caused between said movable interdigitated electrode and said fixed interdigitated electrode by applied driving voltage balances with the reaction force caused by the warping of said movable rod generated by the electrostatic attractive force when a distance of the position of said coupling point to the alignment axis line is within a range that is larger than the value $|L_c|$ and is smaller than any distance said respective movable electrode fingers and the closest fixed electrode finger on the side in the direction represented by the sign of Lc described above with respect to the positional coordinate have therebetween when said movable rod is aligned with said alignment axis line, at any position said movable rod takes in the state when said first and second hinges entirely extend.

6. The electrostatic actuator with the interdigitated electrode structure according to claim 4, wherein the electrostatic attractive force in the direction orthogonal to the longitudinal direction of said movable rod caused between said movable interdigitated electrode and said fixed interdigitated electrode by applied driving voltage balances with the reaction force caused by the warping of said movable rod generated by the electrostatic attractive force when a distance of the position of said coupling point from the alignment axis line is within a range that is larger than the value $|L_c|$ and is smaller than any distance said respective movable electrode fingers and the closest fixed electrode finger on the side in the direction represented by the sign of Lc described above with respect to the positional coordinate have therebetween when said movable rod is aligned with said alignment axis line, at any position said movable rod takes in the state when said first and second hinges entirely extend.

* * * * *

UNITED STATES PATENT AND TRADEMARK OFFICE
CERTIFICATE OF CORRECTION

| | | |
|---|---|---|
| PATENT NO. | : 7,659,652 B2 | Page 1 of 1 |
| APPLICATION NO. | : 12/005222 | |
| DATED | : February 9, 2010 | |
| INVENTOR(S) | : Yoshichika Kato and Keiichi Mori | |

It is certified that error appears in the above-identified patent and that said Letters Patent is hereby corrected as shown below:

On the cover page of the published patent, the information listed for the assignee is:

-- Japan Aviation Electronics Industry Limited, Tokyo (JP) --

Signed and Sealed this
Fourteenth Day of June, 2011

David J. Kappos
*Director of the United States Patent and Trademark Office*